Jan. 2, 1951 F. E. STRATTON 2,536,104
PULLING-OVER MACHINE
Filed July 10, 1948 2 Sheets-Sheet 1

Inventor
Frank E. Stratton
By his Attorney

Jan. 2, 1951          F. E. STRATTON          2,536,104
PULLING-OVER MACHINE
Filed July 10, 1948          2 Sheets-Sheet 2
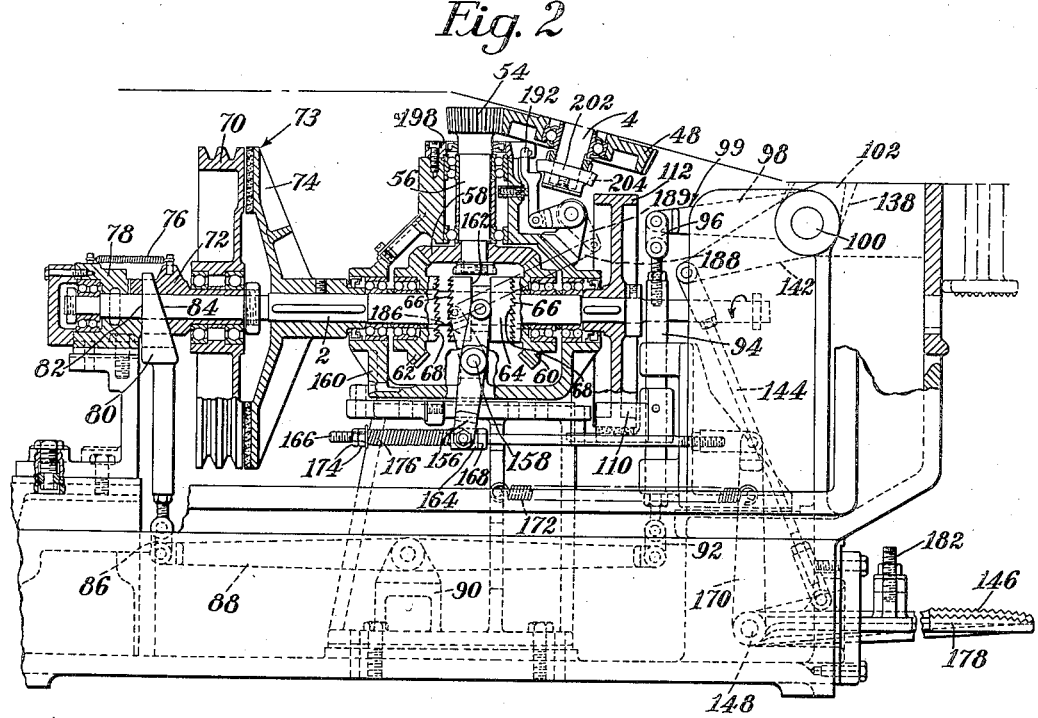
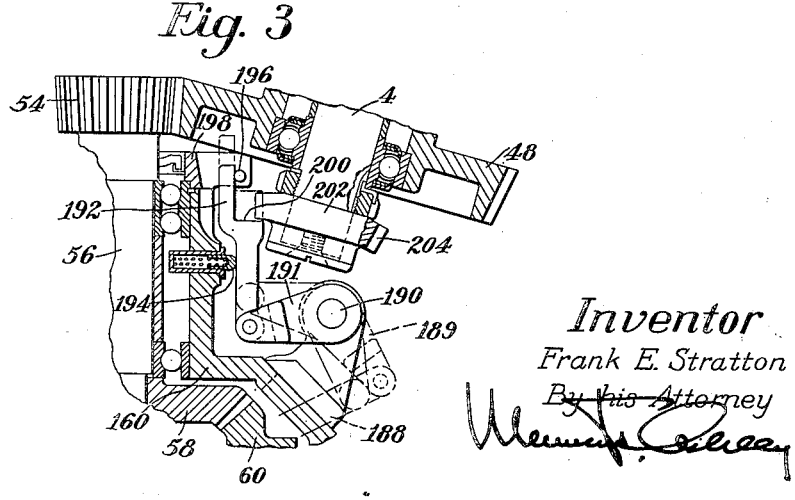
*Inventor*
*Frank E. Stratton*
By his Attorney Patented Jan. 2, 1951

2,536,104

UNITED STATES PATENT OFFICE 2,536,104

PULLING-OVER MACHINE

Frank E. Stratton, Beverly, Mass., assignor to United Shoe Machinery Corporation, Flemington, N. J., a corporation of New Jersey Application July 10, 1948, Serial No. 38,051

12 Claims. (Cl. 12—10.4)

This invention relates to machines for use in the manufacture of shoes for pulling uppers over lasts. The principal features characteristic of a well-known type of power-operated machine for that purpose are disclosed, for example, in United States Letters Patent No. 1,029,387, granted on June 11, 1912, on an application of R. F. McFeely's. A machine embodying such features has been modified heretofore to operate on a shoe in such an inclined position that its bottom faces downward and toward the rear of the machine, as shown, for example, in United States Letters Patent No. 1,510,851, granted on October 7, 1924, on an application of A. E. Jerram's and J. Gouldbourn's. The present invention is herein shown as applied to a machine of that type modified to operate on a shoe in such an inclined position, although it is to be understood that in some aspects the invention is not limited to an organization of that particular character.

A machine of the above-mentioned type is provided with grippers for pulling the upper over the last in the first stage of a cycle of power operations of the machine and for then holding the upper under tension with the machine at rest to permit it to be inspected by the operator and to be adjusted relatively to the last as may be necessary. If the upper has been properly pulled the machine is thereafter again started to cause it to complete its cycle of operations and thereby to fasten the upper in pulled-over position. Occasionally, however, such inspection of the upper may show that it has not been properly gripped and that it is accordingly necessary to release it and to grip and pull it a second time. The present invention provides novel means for use under those conditions to reverse a portion of the machine and return the parts to starting positions. The machine herein shown includes, as usual, a cam shaft having cam means thereon for operating the grippers and other parts, a driving shaft to which power is applied through a clutch upon depression of a starting treadle to operate the cam shaft, and automatic means for controlling the clutch to stop the rotation of the driving shaft at the end of the first stage of the cycle to permit the inspection of the upper and again at the end of the cycle. To permit the shoe to be conveniently operated upon in the above-mentioned inclined position, the driving shaft and the cam shaft are arranged in angular relation to each other. For purposes of this invention the connections herein shown between the driving shaft and the cam shaft include a pair of gears connected at all times to the cam shaft and rotatable respectively in opposite directions about the axis of the driving shaft, and a clutch member on the driving shaft normally connected to one of the pair of gears for rotating the cam shaft in a forward direction but optionally movable at the end of the first stage of the cycle to connect it to the other of the pair of gears and thus to reverse the direction of rotation of the cam shaft and cause it to be returned to starting position by further rotation of the driving shaft in the same direction. For thus moving the clutch member there is provided a reversing treadle by continued movement of which the starting treadle is operated to start the rotation of the driving shaft. The operator holds the reversing treadle depressed until the cam shaft has been returned to starting position, and upon release of the treadle the clutch member is returned by a spring to its normal position. To prevent accidental breakage of parts by reason of depression of the reversing treadle at the wrong time, there is further provided a safety member which is necessarily moved when the clutch member is moved to reversing position but is arranged to engage means on the cam shaft to prevent such movement of the clutch member at any time except at the end of the first stage of the cycle.

The novel features above outlined, including various novel details of construction and combinations of parts, will now be more particularly described with reference to the accompanying drawings and thereafter pointed out in the claims.

In the drawings,

Fig. 2 is a view similar to Fig. 1 of a portion of the structure which joins that shown in Fig. 1 underneath;

Fig. 3 is a view similar to Fig. 2, on an enlarged scale, of a portion of the structure shown in Fig. 2.

Figure 1:
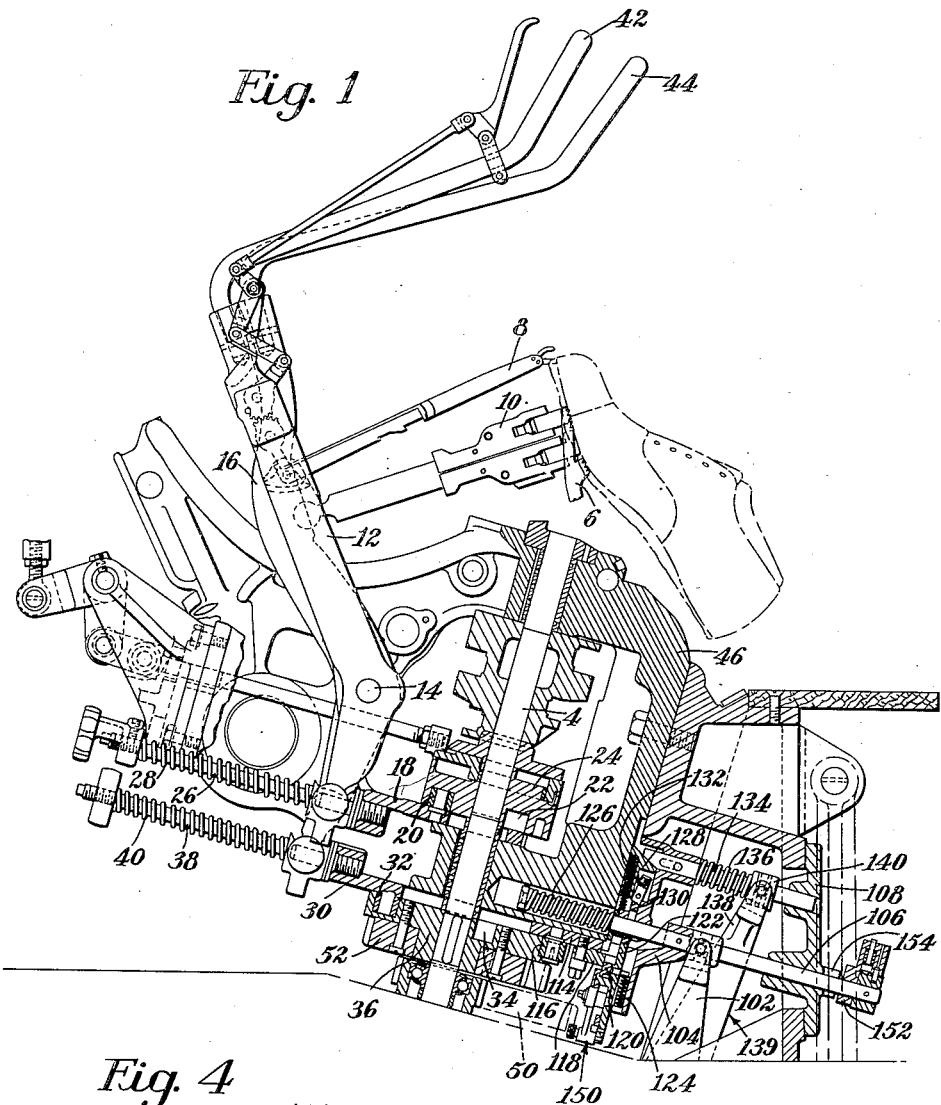
Fig. 1 is a view partly in left-hand side elevation and partly in section of a portion of the machine to which the invention is herein shown as applied.

Only as much of the machine is herein shown as is necessary for an understanding of the invention. The machine includes a horizontal driving shaft 2 and an upwardly and downwardly extending cam shaft 4, somewhat forwardly inclined, which by means hereinafter described is connected to and operated by the driving shaft during each cycle of operations of the machine, the cycle corresponding to one complete revolution of the cam shaft. By means of a sole rest 6, a portion of which is shown in Fig. 1, the shoe is positioned for the operation of the machine thereon at an inclination of substantially 60° to the horizontal with its bottom facing downwardly and toward the rear of the machine. For pulling the upper over the last there are provided, as usual, a toe gripper 8 which grips and pulls the upper at the end of the toe and a pair of opposite side grippers 10 which grip and pull it respectively at the opposite sides of the forepart, only the right-hand side gripper being visible in the drawings. The toe gripper is connected to and operated by a so-called updraw lever 12 pivotally mounted between its upper and lower ends on a rod 14, and the side grippers are connected to and operated by updraw levers 16 also mounted on the rod 14, only the lever 16 corresponding to the right-hand side gripper being shown. The lever 12 is operated by a cam slide 18 provided with a roll 20 which lies in a groove 22 formed in a cam 24 fast on the cam shaft 4. The cam slide carries a rod 26 which may move relatively to the lever 12 and acts on the lever yieldingly through a spring 28. Similarly the side updraw levers 16 are operated by a cam slide 30 provided with a roll 32 which lies in a groove 34 in a cam 36 fast on the cam shaft, this cam slide carrying rods 38 which act respectively on the levers 16 through springs 40 on the rods. Extending forwardly from the upper end of the toe gripper updraw lever 12 is a bar 42, and similarly extending from the upper ends of the side updraw levers 16 are bars 44, only one of which is shown, the front end portions of the bars serving as handles whereby the operator may conveniently move the different grippers to vary the force of the pull on the upper or to adjust the upper relatively to the last while it is held under tension. Except for the forwardly extending bars 42 and 44 the construction shown in Fig. 1 and thus far described is essentially the same as in Letters Patent No. 1,029,387, except that a casting 46 supporting the cam shaft 4 and other parts is secured to the frame of the machine at such an angle that the shoe occupies the inclined position above described, this position of the casting 46 resulting in the forward inclination of the cam shaft.

Rotatable on ball bearings on the lower end of the cam shaft 4 is a bevel gear 48 (Figs. 2 and 3) connected by reduction gearing 50 (Fig. 1), not shown in detail, to a gear wheel 52 fast on the cam 36 which, as above stated, is fast on the cam shaft, the construction accordingly being such that the cam shaft is driven at a slower speed than the bevel gear 48. This gear is in mesh with another bevel gear 54 fast on the upper end of a short vertical shaft 56, and on the lower end of this shaft is secured a bevel gear 58. Mounted on ball bearings on the driving shaft 2 in opposed relation to each other are two bevel gears 60 and 62 in mesh with the gear 58 and therefore at all times connected to the cam shaft 4. Splined on the driving shaft between the bevel gears 60 and 62 is a clutch member 64 on each of the opposite ends of which are formed clutch teeth 66 arranged to engage cooperating clutch teeth 68 on the corresponding gear 60 or 62 to connect that gear to the driving shaft for rotation therewith. Normally the member 64 is held by means hereinafter described in the position in which it is shown in Fig. 2, thereby connecting the gear 60 to the shaft 2 for turning the cam shaft 4 in a forward direction to operate the machine. Movement of the member 64 to connect the gear 62 instead of the gear 60 to the shaft 2 serves to position the parts in proper relation for turning the cam shaft 4 in the reverse direction as and for the purpose hereinafter described.

For turning the driving shaft 2 there is provided a belt-driven pulley 70 mounted on ball bearings on a spool 72 which is loose on the shaft and through which the pulley may be moved in directions lengthwise of the shaft, the pulley serving as one member of a friction clutch 73 in cooperation with another clutch member 74 fast on the shaft. A spring 76 connected to the spool 72 and to a bearing member 78 for the shaft 2 holds the pulley normally out of frictional engagement with the member 74. For moving the pulley into such engagement there is provided a vertically movable wedge member 80 the upper end of which is bifurcated and is provided with vertical faces 82 in bearing engagement with the member 78 and with inclined faces 84 in engagement with similarly inclined faces on the spool 72. At its lower end the member 80 is connected by a link 86 to the rear end of a lever 88 pivotally mounted midway between its opposite ends on a bracket 90 at the base of the machine. The front end of this lever is connected by a link 92 to the lower end of a rod 94 guided for vertical movements in lugs on the frame. The upper end of the rod 94 is connected by a link 96 to one arm 98 of a bell-crank lever 99 mounted to swing on a rod 100 on the frame. The other arm 102 of this bell-crank lever has a bifurcated upper end (Fig. 1) connected to a block 104 which is fast on a rod 106 guided for lengthwise movements by a plate 108 on the frame. The rod 106 therefore controls the wedge member 80, this rod corresponding to the rod 984 of the starting and stopping mechanism shown in United States Letters Patent No. 791,986, granted on June 6, 1905 on an application of R. F. McFeely's. When the rod is in the position shown the wedge member 80 is in a lowered position, so that the clutch members 70 and 74 are disengaged from each other, and at the same time a brake shoe 110 fast on the vertically movable rod 94 is in engagement with the periphery of a brake drum 112 fast on the driving shaft 2. The rod 106 is held in this position by mechanism constructed essentially as shown and described in the last-mentioned Letters Patent. Briefly this mechanism includes a slide 114 provided with a roll 116 engaged by the periphery of the previously mentioned cam 36, the roll being held against the cam by springs (not shown) which control the slide 114 and correspond to the springs $X^{38}$ and $X^{40}$ shown in the last-mentioned Letters Patent. Fast on the slide 114 is a small block 118 in engagement with a member 120 supported by the block 104. Accordingly the cam 36 acts through the slide 114, the block 118 and the member 120 to hold the rod 106 in the position to cause the machine to remain idle.

To start the machine there is further provided mechanism also constructed mainly as shown in Letters Patent No. 791,986. For this purpose the member 120 is mounted on a slide 122 which is movable on the block 104 in directions at right angles to the directions of movement of the slide 114 and is thus movable downwardly against the resistance of a spring 124. Such downward movement of the slide 122 carries the member 120 out of position to be held by the block 118, whereupon a spring 126 on the rod 106 moves the rod in a rearward direction and thereby forces the wedge member 80 upwardly to engage the clutch member 70 with the member 74 and at the same time lowers the brake shoe 110. In the manner fully disclosed in the last-mentioned Letters Patent, the cam 36 thereafter causes the slide 114 to be retracted by its controlling springs until the slide 122 can be returned by its spring 124 to position the member 120 again in its initial relation to the block 118, after which further movement of the cam serves at the proper time to return the rod 106 into position to stop the machine.

The slide 122 is moved downwardly as above described to start the machine by downward movement of another slide 128 corresponding to the slide X⁶⁰ shown in Letters Patent No. 791,986, this slide having pivotally mounted thereon a small lever 130 corresponding to the lever X⁶⁴ of said Letters Patent, the lower end face of the lever abutting against the upper end of the slide 122. Such downward movement is imparted to the slide 128 against the resistance of a return spring 132 by a rod 134 having a wedge face in engagement with a correspondingly inclined face on the end of the slide. In the construction herein shown the rod 134 is operated against the resistance of a return spring 136 by one arm 138 of a bell-crank lever 139 mounted to swing about the rod 100, th's arm being connected to a collar 140 which is fast on the rod 134 and against which the spr'ng 136 abuts. The other arm 142 of the bell-crank lever 139 is connected by a link 144 to a starting treadle 146 mounted to swing about a rod 148.

It will be evident that in stopping the machine the cam 36 acts positively through the mechanism described to apply the brake shoe 110 to the drum 112. To vary the force with which the brake shoe thus acts on the drum the member 120 on the slide 122 is adjustable in directions widthwise of the machine and is so formed that by that adjustment it causes the brake shoe to apply more or less force to the drum, this member corresponding to the member 26 shown in United States Letters Patent No. 1,771,045, granted on July 22, 1930 on an application of B. Jorgensen's. For thus adjusting the member 120 there is mounted on the slide 122 mechanism, identified generally by the reference character 150, which is essent'ally of the same construction as the mechanism shown in the last-mentioned Letters Patent for adjusting the member 26.

As in the construction shown in Letters Patent No. 791,986, there is further provided means which may be used, if desired, to prevent accidental starting of the machine by the treadle 146. This means comprises a block 152 mounted on the front end of the rod 106 for turning movement either into position to permit it normally to enter a recess 154 formed in a boss on the plate 108 in response to the movement of the rod by the spring 126 or into position to engage the end of the boss without entering the recess, thereby preventing such movement of the rod as to engage the clutch member 70 with the member 74. The block 152 is held in either adjusted position by means of the same character as disclosed in the last-mentioned Letters Patent.

Figure 4:
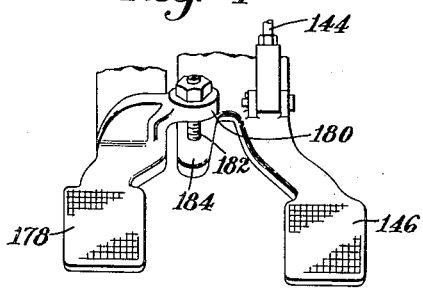
Fig. 4 is a perspective view of the treadles for starting and reversing the operation of the machine and of parts associated therewith.

As in prior machines of the type to which the invention is herein shown as applied, the cam 36 is so formed as to stop the machine not only at the end of the cycle, but also at the end of the first stage of the cycle when the grippers have pulled the upper and are holding it under tension, to permit the operator to inspect the upper and to adjust it relatively to the last as may be necessary. Occasionally it is found, upon such inspection, that the upper has not been properly gripped by one or more of the grippers and that it accordingly should be gripped and pulled a second time. Under those conditions, in the use of the machine herein shown, the direction of rotation of the cam shaft 4 may be conveniently reversed and the parts operated in the first stage of the cycle may be caused to return to starting positions by moving the previously mentioned clutch member 64 into position to connect it to the gear 62 and by then starting the driving shaft 2. As previously stated, the clutch member 64 is normally connected to the gear 60, as shown, for turning the cam shaft in a forward direction. The clutch member is controlled by a lever 156 fast on a rockshaft 158 which is mounted in bearings in a member secured to a housing 160 enclosing the gears 58, 60 and 62, the bifurcated upper end of the lever being provided with rolls (not shown) which lie in a groove 162 in the clutch member. Pivotally mounted on the lower end of the lever 156 is a trunnion block 164 in which is slidingly mounted a forwardly and rearwardly extending rod 166 having fast thereon a collar 168 arranged to engage the front end of the trunnion block. The front end of the rod 166 is pivotally connected to an arm 170 mounted to swing about the rod 148, and connected to this arm is a spring 172 which tends to move the rod in a rearward direction and therefore, by reason of the engagement of the collar 168 with the trunnion block 164, normally holds the clutch member 64 in the position shown. Between the rear end of the trunnion block 164 and nuts 174 on the rod 166 is a spring 176 through which the lever 156 is operated to move the clutch member 64 into position to connect it with the gear 62 in response to forward movement of the rod 166. For thus moving the rod forwardly there is provided a reversing treadle 178 integral with the arm 170. As shown in Fig. 4, this treadle has formed thereon a laterally extending lug 180 in which is mounted a screw 182 in position for engagement with a lug 184 on the starting treadle 146. Initially the lower end of the screw 182 is far enough above the lug 184 to permit such movement of the reversing treadle 178 as to connect the clutch member 64 with the gear 62 before the screw engages the lug. Thereafter further movement of the reversing treadle serves, by reason of engagement of the screw 182 with the lug 184, to operate the starting treadle 146 and thereby to start the rotation of the driving shaft 2, the spring 176 being compressed by such further movement of the reversing treadle. While the operator holds the reversing treadle depressed, therefore, the cam shaft 4 is turned reversely to its starting position, and when it arrives in that position the cam 36, by its action on the rod 106 in the manner hereinbefore described, stops the rotation of the driving shaft 2. The operator then releases the reversing treadle, whereupon the clutch member 64 is returned by the spring 172 to its normal position in which it is connected to the gear 60. It will be evident that in the normal operation of the machine the gear 62 turns idly on its bearings and that the gear 60 turns idly during the reverse movement of the cam shaft.

To prevent accidental breaking of parts, mechanism is further provided for preventing movement of the clutch member 64 by depression of the reversing treadle 178 at any time except when the machine is stopped after completing the first stage of its cycle. For this purpose there is fast on the rockshaft 158 an arm 186 connected by a link 188 to an arm 189 fast on a rockshaft 190 (Fig. 3) on the housing 160, and also fast on this rockshaft is an arm 191 pivotally connected to an upwardly extending finger 192. A spring-pressed pin 194 in the housing 160 normally holds the finger 192 in a position determined by engagement of its upper end with a pin 196 mounted in a member 198 secured to the housing. When the finger is in this position a shoulder 200 thereon extends inwardly under the rim of a wheel 202 fast on the lower end of the cam shaft 4. Accordingly this wheel prevents such upward movement of the finger as necessarily results from depression of the reversing treadle 178. At the time, however, when the machine comes to a stop with the grippers holding the upper under tension a recess 204 in the rim of the wheel 202 is in vertical alinement with the shoulder 200 on the finger 192 and therefore permits the reversing movement of the clutch member 64, the finger being moved upward to the position illustrated by broken lines in Fig. 3. A wall of the recess 204 is so formed that as the cam shaft starts to turn in the reverse direction the finger is deflected out of the recess against the resistance of the spring-pressed pin 194. It will be understood that when the reversing treadle is released by the operator the finger returns to the normal position in which it is shown in Fig. 3.

While the manner of operation of the parts provided for purposes of the invention has already been described, it will now be briefly summarized. The operator presents a shoe in engagement with the sole rest 6 with the margin of the upper between the jaws of the several grippers and then starts the machine by depression of the starting treadle 146. At this time the clutch member 64 (Fig. 2) is connected to the bevel-gear 60 and is held in that position by the action of the spring 172 on the arm 170. Accordingly, by the turning of the driving shaft 2 the cam shaft 4 is turned in the forward direction through the gearing by which it is connected to the gear 60. At the end of the first stage of the cycle, after the grippers have pulled the upper and while they are holding it under tension, the rotation of the driving shaft is stopped by the action of the cam 36 on the rod 106 in the manner common heretofore in machines of the type to which the invention is shown as applied. The operator then inspects the upper and if it has been properly gripped and pulled adjusts it relatively to the last as may be necessary in the manner customary in the use of machines of this type and thereafter again starts the machine by depression of the treadle 146 to cause it to complete its cycle. In the event, however, that the upper has not been properly gripped, so that it is desirable to release it and to grip and pull it a second time, the operator depresses the reversing treadle 178. The depression of this treadle serves first, through the movement of the rod 166 and the lever 156, to disconnect the clutch member 64 from the gear 60 and to connect it instead to the gear 62, so that the cam shaft 4 will be turned in the reverse direction by further movement of the driving shaft 2 in the same direction. Further depression of the reversing treadle causes the screw 182 thereon to depress the starting treadle 146 and thereby to start the rotation of the driving shaft. Accordingly the grippers are returned to their starting positions and the upper is released, the rotation of the driving shaft being stopped by the action of the cam 36 on the rod 106 when the cam shaft arrives in its starting position. When the operator thereafter releases the reversing treadle the clutch member 64 is returned by the spring 172 to its normal position in which it connects the driving shaft 2 to the gear 60. If the reversing treadle should be depressed at any time except at the end of the first stage of the cycle, such depression of that treadle will not move the clutch member 64 into reversing position because of engagement of the finger 192 with the rim of the wheel 202 on the cam shaft.

Having described the invention, what I claim as new and desire to secure by Letters Patent of the United States is:

1. In a pulling-over machine, the combination with grippers for pulling an upper over a last, of a cam shaft having cam means thereon for thus operating said grippers, a driving shaft in angular relation to said cam shaft for operating it, automatic means for stopping the rotation of said driving shaft at the end of one stage of a cycle of operations of the machine when the grippers are holding the upper under tension and again at the end of the cycle, and operating connections between the driving shaft and the cam shaft including a clutch member on the driving shaft for optionally reversing the direction of rotation of the cam shaft at the end of the above-mentioned stage of the cycle and for returning it to starting position in response to further rotation of the driving shaft in the same direction.

2. In a pulling-over machine, the combination with grippers for pulling an upper over a last, of a cam shaft having cam means thereon for thus operating said grippers, a driving shaft in angular relation to said cam shaft for operating it, a clutch on said driving shaft, automatic means for stopping the rotation of the driving shaft by control of said clutch at the end of one stage of a cycle of operations of the machine when the grippers are holding the upper under tension and again at the end of the cycle, and operating connections between the driving shaft and the cam shaft including a clutch member on the driving shaft for optionally reversing the direction of rotation of the cam shaft at the end of the above-mentioned stage of the cycle and for returning it to starting position in response to further rotation of the driving shaft in the same direction.

3. In a pulling-over machine, the combination with grippers for pulling an upper over a last, of a cam shaft having cam means thereon for thus operating said grippers, a driving shaft in angular relation to said cam shaft for operating it, automatic means for stopping the rotation of said driving shaft at the end of one stage of a cycle of operations of the machine when the grippers are holding the upper under tension and again at the end of the cycle, a pair of gears connected at all times to said cam shaft and connected together for rotation respectively in opposite directions, and means for normally connecting one of said gears to the driving shaft to rotate the cam shaft in a forward direction and for optionally connecting the other of said gears to the driving shaft at the end of the above-mentioned stage of the cycle to reverse the direction of rotation of the cam shaft and return it to starting position in response to further rotation of the driving shaft in the same direction.

4. In a pulling-over machine, the combination with grippers for pulling an upper over a last, of a cam shaft having cam means thereon for thus operating said grippers, a driving shaft in angular relation to said cam shaft for operating it, automatic means for stopping the rotation of said driving shaft at the end of one stage of a cycle of operations of the machine when the grippers are holding the upper under tension and again at the end of the cycle, a pair of gears connected at all times to said cam shaft and connected together for rotation respectively in opposite directions, said gears being rotatable about the axis of the driving shaft, and a clutch member on said driving shaft for normally connecting one of said gears thereto to rotate the cam shaft in a forward direction and for optionally connecting the other of said gears thereto at the end of the above-mentioned stage of the cycle to reverse the direction of rotation of the cam shaft and return it to starting position in response to further rotation of the driving shaft in the same direction.

5. In a pulling-over machine, the combination with grippers for pulling an upper over a last, of a cam shaft having cam means thereon for thus operating said grippers, a driving shaft in angular relation to said cam shaft for operating it, automatic means for stopping the rotation of said driving shaft at the end of one stage of a cycle of operations of the machine when the grippers are holding the upper under tension and again at the end of the cycle, a pair of bevel gears mounted in opposed relation to each other for rotation about the axis of the driving shaft, another bevel gear connected at all times to the cam shaft and connecting said pair of gears together for rotation respectively in opposite directions, and a clutch member on said driving shaft for normally connecting one of said pair of gears thereto to rotate the cam shaft in a forward direction and for optionally connecting the other of said pair of gears thereto at the end of the above-mentioned stage of the cycle to reverse the direction of rotation of the cam shaft and return it to starting position in response to further rotation of the driving shaft in the same direction.

6. In a pulling-over machine, the combination with grippers for pulling an upper over a last, of a cam shaft having cam means thereon for thus operating said grippers, a driving shaft rotatable invariably in the same direction for operating said cam shaft, automatic means for stopping the rotation of said driving shaft at the end of one stage of a cycle of operations of the machine when the grippers are holding the upper under tension and again at the end of the cycle, and operating connections between the driving shaft and the cam shaft including a member optionally shiftable on the driving shaft at the end of the above-mentioned stage of the cycle to reverse the direction of rotation of the cam shaft and cause it to be returned to starting position by further rotation of the driving shaft.

7. In a pulling-over machine, the combination with grippers for pulling an upper over a last, of a cam shaft having cam means thereon for thus operating said grippers, a driving shaft rotatable invariably in the same direction for operating said cam shaft, automatic means for stopping the rotation of said driving shaft at the end of one stage of a cycle of operations of the machine when the grippers are holding the upper under tension and again at the end of the cycle, a pair of gears connected at all times to said cam shaft and connected together for rotation respectively in opposite directions about the axis of the driving shaft, and a member for normally connecting one of said gears to the driving shaft to rotate the cam shaft in a forward direction, said member being optionally movable at the end of the above-mentioned stage of the cycle to connect the other of said gears to the driving shaft and thus to cause the cam shaft to be turned reversely to starting position by further rotation of the driving shaft.

8. In a pulling-over machine, the combination with grippers for pulling an upper over a last, of a cam shaft having cam means thereon for thus operating said grippers, a driving shaft in angular relation to said cam shaft for operating it, a starting treadle for starting rotation of the driving shaft, automatic means for stopping the rotation of the driving shaft at the end of one stage of a cycle of operations of the machine when the grippers are holding the upper under tension and again at the end of the cycle, operating connections between the driving shaft and the cam shaft including a clutch member optionally movable to reverse the direction of rotation of the cam shaft at the end of the above-mentioned stage of the cycle to cause the cam shaft to be returned to starting position by further rotation of the driving shaft in the same direction, a reversing treadle for thus moving said clutch member, and means for operating said starting treadle to start the driving shaft by the movement of said reversing treadle.

9. In a pulling-over machine, the combination with grippers for pulling an upper over a last, of a cam shaft having cam means thereon for thus operating said grippers, a driving shaft for operating said cam shaft, automatic means for stopping the rotation of the driving shaft at the end of one stage of a cycle of operations of the machine when the grippers are holding the upper under tension and again at the end of the cycle, a pair of gears connected at all times to said cam shaft and connected together for rotation respectively in opposite directions, a clutch member for normally connecting one of said gears to the driving shaft to rotate the cam shaft in a forward direction, a reversing member optionally movable by the operator at the end of the above-mentioned stage of the cycle to move said clutch member into position to connect the other of said gears to the driving shaft to reverse the direction of rotation of the cam shaft and cause it to be returned to starting position by further rotation of the driving shaft in the same direction, and spring means for automatically returning said clutch member to its normal position upon release of the reversing member by the operator.

10. In a pulling-over machine, the combination with grippers for pulling an upper over a last, of a cam shaft having cam means thereon for thus operating said grippers, a driving shaft for operating said cam shaft, automatic means for stopping the rotation of the driving shaft at the end of one stage of a cycle of operations of the machine when the grippers are holding the upper under tension and again at the end of the cycle, a pair of gears connected at all times to said cam shaft and connected together for rotation respectively in opposite directions about the axis of the driving shaft, a clutch member on the driving shaft for normally connecting one of said gears thereto to rotate the cam shaft in a forward direction, a reversing treadle for optionally moving said clutch member into position to connect the other of said gears to the driving shaft at the end of the above-mentioned stage of the cycle to reverse the direction of rotation of the cam shaft and cause it to be returned to starting position by further rotation of the driving shaft in the same direction, and spring means for automatically returning said clutch member to its normal position upon release of the reversing treadle by the operator.

11. In a pulling-over machine, the combination with grippers for pulling an upper over a last, of a cam shaft having cam means thereon for thus operating said grippers, a driving shaft for operating said cam shaft, automatic means for stopping the rotation of said driving shaft at the end of one stage of a cycle of operations of the machine when the grippers are holding the upper under tension and again at the end of the cycle, operating connections between the driving shaft and the cam shaft including a clutch member optionally movable at the end of the above-mentioned stage of the cycle to reverse the direction of rotation of the cam shaft and cause it to be returned to starting position by further rotation of the driving shaft in the same direction, a safety member arranged to be moved when the clutch member is thus moved, and means on the cam shaft for engaging said safety member to prevent such movement of the clutch member when the parts of the machine are in starting positions.

12. In a pulling-over machine, the combination with grippers for pulling an upper over a last, of a cam shaft having cam means thereon for thus operating said grippers, a driving shaft for operating said cam shaft, automatic means for stopping the rotation of said driving shaft at the end of one stage of a cycle of operations of the machine when the grippers are holding the upper under tension and again at the end of the cycle, operating connections between the driving shaft and the cam shaft including a clutch member optionally movable at the end of the above-mentioned stage of the cycle to reverse the direction of rotation of the cam shaft and cause it to be returned to starting position by further rotation of the driving shaft in the same direction, a safety member arranged to be moved when the clutch member is thus moved, and a device mounted on said cam shaft to turn therewith and arranged to engage said safety member to prevent such movement of the clutch member when the parts of the machine are in starting positions, said device having a recess therein movable in the above-mentioned stage of the cycle into position to receive said safety member and permit such movement of the clutch member.

FRANK E. STRATTON.

REFERENCES CITED

The following references are of record in the file of this patent:

UNITED STATES PATENTS

| Number | Name | Date |
|---|---|---|
| 1,962,260 | Roberts | June 12, 1934 |
| 1,980,435 | Pym et al. | Nov. 13, 1934 |